(No Model.)
M. L. FULLER.
MECHANISM FOR THE PRODUCTION OF STAGE EFFECTS.
No. 513,102.  Patented Jan. 23, 1894.
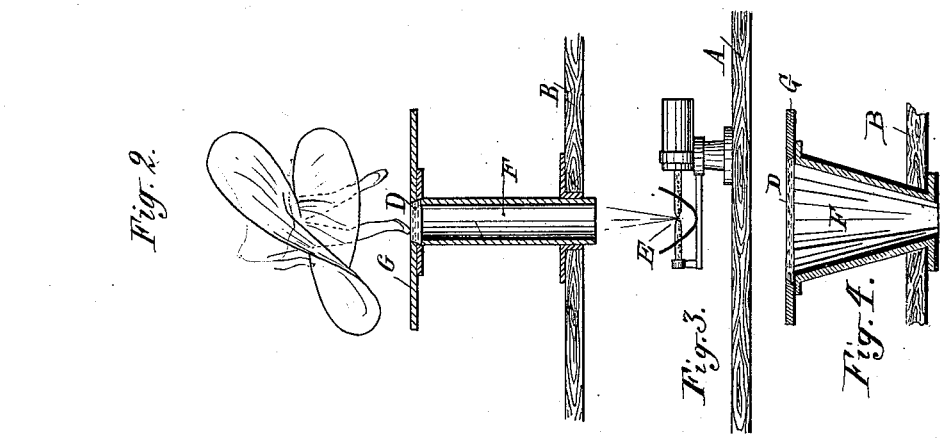
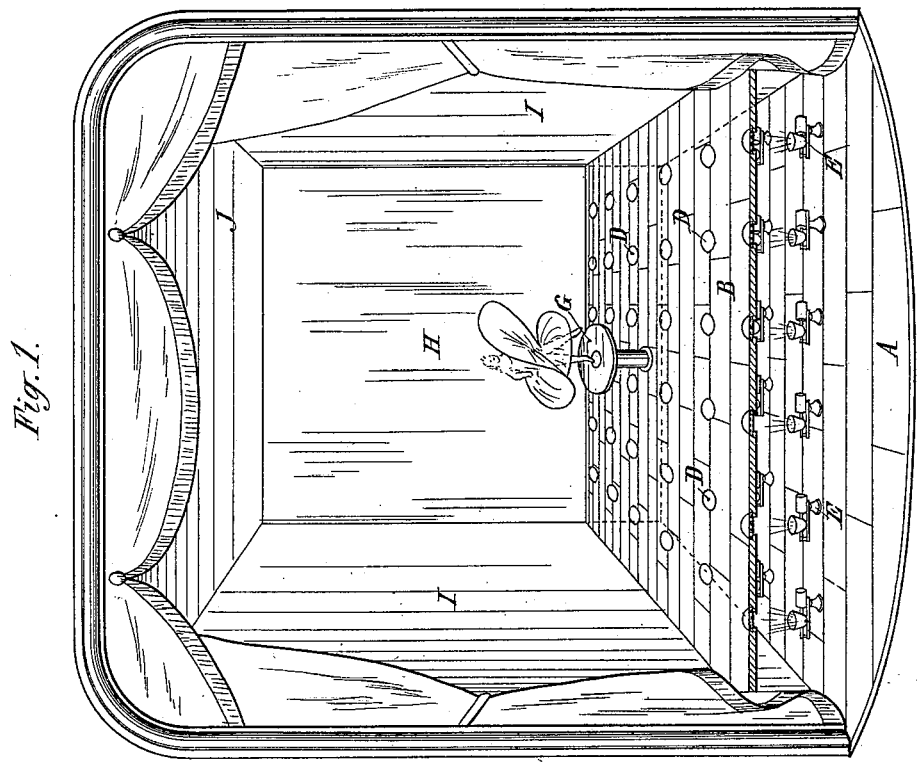
WITNESSES:
INVENTOR
Marie Louise Fuller.
BY
ATTORNEY.

UNITED STATES PATENT OFFICE.

MARIE LOUISE FULLER, OF NEW YORK, N. Y.

MECHANISM FOR THE PRODUCTION OF STAGE EFFECTS.

SPECIFICATION forming part of Letters Patent No. 513,102, dated January 23, 1894.

Application filed October 12, 1893. Serial No. 488,005. (No model.) Patented in France April 8, 1893, No. 227,105, and in England May 24, 1893, No. 10,301.

*To all whom it may concern:*

Be it known that I, MARIE LOUISE FULLER, a resident of the city, county, and State of New York, have invented certain new and useful Improvements in Mechanism for the Production of Stage Effects, particularly of an illusionary character, (for which I have obtained patents in Great Britain, No. 10,301, dated May 24, 1893, and in France, No. 227,105, dated April 8, 1893,) of which the following is a specification.

Figure 1 is a perspective view of a theatrical stage setting, partially in section, to show the illuminating foyer below the stage. Fig. 2 is a vertical section of a portion of my invention by which an illusionary effect is produced. Fig. 3 shows a lighting device to be used in connection with my invention, and Fig. 4 shows a modification of one of the details of my invention.

A is an ordinary stage flooring.

B is a false flooring of glass, or wood and glass, in which latter case the wooden flooring may be pierced with a number of holes of any suitable size or shape in which may be embedded thick and transparent plaques of glass or lenses D D. Beneath each of these plaques, I place electric or calcium lights E so disposed that the rays thereof will be projected upward by any suitable reflector through the plaques or lenses D D. At one or more points in the false staging I can, if desirable, place one or more pedestals F, each of which supports at its upper end a suitable plaque G. This pedestal may be of plain or fanciful form and by preference it is hollow and made of glass for the purpose hereinafter described. The plaque G, by preference, is made of glass and is preferably silvered on its lower side, outside of the pedestal, the back of the silvering being blackened for the purpose hereinafter described. The center of the plaque, or that portion directly above the pedestal, is preferably transparent.

By preference the inner side of the pedestal F, when made from glass, is silvered; the sides of the pedestal when it is silvered on the inner side diverge from their lower end toward the top, as shown in Fig. 4 so as to reflect toward the audience the stage flooring. Underneath each pedestal, in the illuminating foyer, between the floor A and false flooring B, is placed an electric or calcium light which reflects the rays of light directly upward through the pedestal, and through the central transparent portion of the glass plaque.

In producing the illusionary effect, it is desirable that the stage B upon which the pedestal F rests, or the lower floor A, the background H, wings I and flies J may be of a solid color, preferably black, in which case it will be readily seen that the pedestal F will reflect the black flooring inasmuch as the pedestal, when made of looking-glass, diverges from the bottom toward the top, thereby affording to the dancer, a support that is invisible to the audience. It will now be seen that the figure of the dancer clothed, preferably, in white or in some color sufficiently contrasting with the color of the scene, standing on a plaque in the floor, or on a plaque on the top of the pedestal, will appear to be mysteriously suspended in the air. By turning on the light from below and by illuminating, if desirable, from the wings of the stage by projected light, the figure will, as before stated, be apparently suspended in the air. Graceful evolutions may be performed without marring the illusion. The rays of light coming up through the center of the plaque upon which the figure stands, will illuminate the garment of the dancer which garment will be reflected by means of the looking-glass plaque G toward the observer, exactly as the figure of the person and the garment moves upon the plaque, the remainder of the plaque, (providing the figure does not entirely cover it) reflecting merely the darker back-ground or flies to the rear and above.

If it is desirable that dancers perform on the floor around the pedestal, the said dancers may step directly over the various plaques inserted in the floor of the stage through which lights are projected and the said dancers will seem to dance in a luminous aureola. If desirable, the whole stage floor may be made of glass, in which case the reflectors of the lights are pointed so as to reflect none of the rays toward the audience, in which case all the dancers will seem to be suspended in space by reason of the transparent flooring. It is obvious that when the entire flooring is of glass, the illuminating foyer must be of the same color as the drapery of the stage setting.

The object of coloring the lower side of the plaque supported on the pedestal, as described, is to prevent the audience from detecting the presence of the plaque from below. If desirable the false floor B may be discarded and the plaques placed in the ordinary stage floor.

Having thus described my invention, what I claim, and desire to secure by Letters Patent, is—

1. In a stage mechanism, a looking-glass pedestal F the sides of which pedestal diverge from the bottom toward the top, supported on the stage, said pedestal supporting a plaque G all adapted to produce the illusion, substantially as and for the purpose specified.

2. In a stage mechanism a floor upon which rests a hollow pedestal of looking-glass supporting a glass platform or plaque G which is transparent above the pedestal and silvered on all the lower side except that portion covered by the pedestal, substantially as and for the purpose specified.

3. In a stage mechanism, a hollow looking-glass pedestal F supported on the floor around a transparent plaque in the floor, the sides of the pedestal diverging from the bottom toward the top, upon the upper end of which pedestal is supported a looking-glass plaque transparent directly above the pedestal, the stage decoration being of a plain color in combination with the illuminating device E, substantially as and for the purpose specified.

MARIE LOUISE FULLER.

Witnesses:
R. C. MITCHELL,
H. B. BROWNELL.